Dec. 8, 1931.  A. BOLDUC  1,835,006

ADJUSTING MECHANISM FOR PROPELLER BLADES

Filed Oct. 3, 1929

INVENTOR
Albert Bolduc
BY
ATTORNEYS

Patented Dec. 8, 1931

1,835,006

UNITED STATES PATENT OFFICE

ALBERT BOLDUC, OF DETROIT, MICHIGAN

ADJUSTING MECHANISM FOR PROPELLER BLADES

Application filed October 3, 1929. Serial No. 396,969.

The present invention pertains to a novel adjusting mechanism for propeller blades of the type adapted for propelling aircraft through the air.

A primary object of the present invention is to devise a propeller blade supporting device which will facilitate adjusting the pitch of the blades to increase or decrease the pulling or pushing power of the propeller. Decreasing the pitch slightly and speeding up the motor permits a more rapid ascension to be obtained and when the desired altitude is reached the pitch of the blades may be increased and the speed on the motor lessened.

Another object of the present invention is to devise a propeller blade supporting device which permits the accurate adjustment of the blade pitch relative to each other and which facilitates simultaneous variance of the pitch of the blades while the driving motor is in operation. Convenient means is provided for varying the blade pitch to the different flying conditions, the means extending to the cockpit of the aeroplane so that all flying conditions may be met and the required adjustments made while the aeroplane is in flight.

With these and other ends in view, the invention consists in the matters hereinafter set forth and more particularly pointed out in the appended claims, reference being had to the accompanying drawings, in which—

Like characters are employed throughout to designate the corresponding parts.

Figure 3:
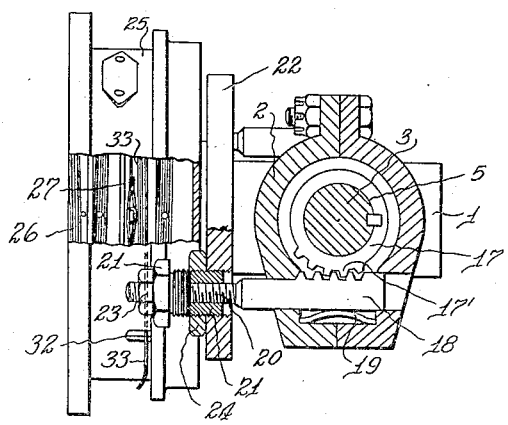
Fig. 3 is a cross sectional view taken on the line 3—3 of Figure 1.
Figure 4:
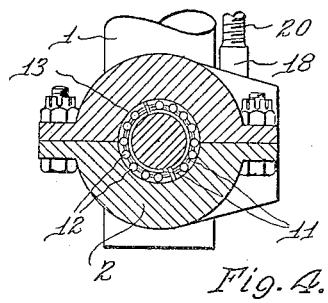
Fig. 4 is a transverse cross sectional view taken on the line 4—4 of Figure 2.
Figure 2:
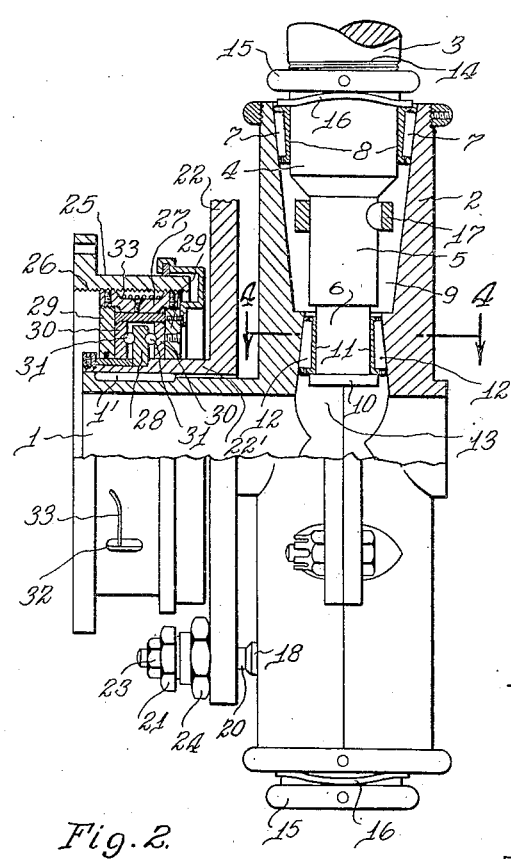
Fig. 2 is a cross sectional view taken on the line 2—2 of Figure 1.
Figure 1:
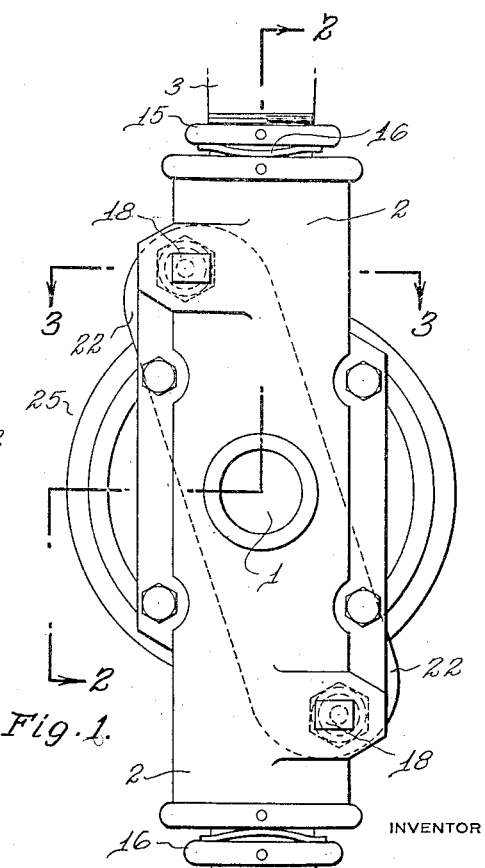
Figure 1 is a front elevation of the present propeller blade supporting device.

The numeral 1 indicates a tubular shaft having integral tubular hub members 2 formed thereon, the hub members being made in two pieces for convenience in manufacture. The propeller blades 3 are supported in the hub members 2, each blade being provided with a cylindrical stem portion 4 which is reduced in diameter as at 5 and again as at 6. The above described stems are provided to accommodate the tapered bearings 7 which are supported in a suitable raceway 8 engaging the stem 4 so that the bearings 7 are in contact with the wall of the tapered well 9 formed in the hubs 2. The portion of the stem 6 is provided with a flange 10 which carries a bearing race 11 supporting tapered bearings 12 against the tapered wall of the well 13 formed in the hubs 2, the tapers of the wells 9 and 13 being opposite to each other.

The taper of the well 13 is such that it prevents the withdrawal of the stem 6 from the well yet it would permit it to move inwardly and thereby cause end play. To prevent any end play, the upper portion of the stem 4 is screw threaded as at 14 and provided with a nut 15 which bears downwardly upon a spring 16 which in turn forces downwardly upon the bearing race 8. The taper of the well 9 prevents the race 8 from moving inwardly and therefore, by screwing the nut 15 downwardly, the stem 4 is forced outwardly, and in this manner resilient means is provided for preventing any end and side play.

On the stem portion 5 of each blade is secured a ring 17 provided with the teeth 17' to engage the teeth on the rack bar 18 which is slidably mounted in an opening in the hub 2, a spring 19 being provided to hold the rack bar yieldably in engagement with the ring 17. The outer ends of the rack bars 18 are provided with screw portions 20 which engage in the nut 21 screw threaded into an opening in a plate 22. A nut 23 is provided on the screw 20 and a locknut 24 on the nut 21 prevents rotation of the latter, this connection obviously permitting accurate adjustment of the rack bar 18 relative to the plate 22.

The plate 22 is provided with a hub portion 22' which surrounds the tubular shaft 1 and is keyed thereto as at 1' to rotate therewith and to move longitudinally thereon. A fixed barrel 25 is bolted firmly to a stationary part of the engine and surrounds the tubular shaft 1 and the hub portion 22', the inner wall of the barrel 25 being screw threaded as at 26. A ring 27 is contained within the barrel and has a screw threaded portion engaging the screw threads 26 whereby rotation of the ring causes longitudinal movement thereof relative to the barrel. A ring or flange 28 is secured to the hub portion 22' and is immovable longitudinally on the hub.

The ring 27 is provided with end closures 29 which support bearing races 30 which in turn support the ball bearings 31 which are interposed between the end closures 29 and the ring or flange 28. The barrel 25 is provided with a pair of openings 32 through which are passed flexible members 33 in the nature of cords, a portion of each cord being oppositely wound around the ring 27 and having the end secured thereto.

From the above description it becomes apparent that movement of the rack bars 18 causes rotation of the propeller blades and adjustments of the pitch thereof may be made by causing longitudinal movement of the bars. The different blades may be accurately adjusted to the same pitch as a result of both bars being adjustably connected to the plate 22. Therefore to adjust the pitch of both blades simultaneously it is merely necessary to move the plate 22 longitudinally relative to the tubular shaft 1.

To adjust the plate 22 longitudinally, it is merely necessary to pull one of the cords 33 which will cause rotation of the ring 27; the rotation causing the ring 27 to move longitudinally relative to the fixed barrel 25. The end closures 29 and the bearings 31 cause longitudinal movement of the ring or flange 28 which in turn, causes longitudinal adjustment of the plate 22.

Although a specific embodiment of the present invention has been illustrated and described, it will be understood that changes may be made within the scope of the appended claims without departing from the spirit of the invention, and such changes are contemplated.

What I claim is:—

1. An adjustable propeller blade supporting device comprising a shaft, hub members formed on said shaft, propeller blades carried in said hub members, a toothed ring carried by said propeller blades, rack bars carried in said tubular hub portions and meshing with the teeth in said ring, a plate mounted on said shaft to rotate therewith, means for adjustably securing said rack bars to said plate, and means including a flexible cord for adjusting said plate longitudinally on said shaft.

2. An adjustable propeller blade supporting device comprising a shaft having hub members adapted to support propeller blades, sliding means contained in said hub members for causing rotation of said blades in said hub members, a plate mounted on said shaft and connected to said sliding means for maintaining said blades in an adjusted position, a stationary barrel, rotatable means contained in said barrel for adjusting said plate longitudinally to rotate said blades, and a cord adapted to be wound around said rotatable means whereby pulling said cord causes rotation of said rotatable means.

3. An adjustable propeller blade supporting device comprising a shaft having blade receiving portions, propeller blades mounted therein, a plate carried by said shaft, connections between said plate and said blades whereby longitudinal movement of said plate rotates said blades, a stationary internally threaded barrel surrounding said shaft, a rotatable ring mounted in said barrel whereby rotation of the ring causes longitudinal movement therein, connecting members between said ring and said plate whereby rotation of the ring causes longitudinal movement of the plate and rotation of the blades, and a cord adapted to be wound around said ring whereby pulling said cord causes rotation of said ring.

4. An adjustable propeller blade supporting device comprising a shaft, a pair of tubular hub members formed on said shaft, propeller blades having stems received in said tubular hubs, bearings between said stems and said hubs, resilient longitudinally adjustable means for preventing end and side play of said stems within said tubular hubs, a ring provided with teeth attached to a stem on each of said blades, rack bars carried by said tubular hubs, a plate carried by said shaft and secured to said rack bars, an internally screw threaded barrel non-rotatively secured to a portion of a motor adapted to drive said shaft, a ring mounted in said barrel whereby rotation of said ring causes longitudinal movement relative to said barrel, a connection between said ring and said plate whereby rotation of said ring causes a longitudinal shifting of said plate and said rack bars to rotate said ring mounted on said propeller blade stem, and a cord adapted to be wound around said ring whereby pulling said cord imparts rotation to said ring.

5. An adjustable propeller blade supporting device comprising a shaft having hub members formed thereon adapted to support propeller blades whereby they may be rotated to vary their pitch, a sliding plate connected to said blades whereby longitudinal movement of said plate changes the pitch of said blades, rotatable means for shifting said plate longitudinally, and a cord adapted to be wound around said rotatable means whereby drawing said cord rotates said means.

In testimony whereof I affix my signature.

ALBERT BOLDUC.